(12) United States Patent
Islam et al.

(10) Patent No.: US 11,031,853 B2
(45) Date of Patent: Jun. 8, 2021

(54) VARIABLE AIR GAP ALONG AXIAL DIRECTION FOR REDUCING COGGING TORQUE IN PERMANENT MAGNET MOTORS

(71) Applicant: MANDO CORPORATION, Gyeonggi-do (KR)

(72) Inventors: Mohammad Islam, Saginaw, MI (US); Mazharul Chowdhury, Midland, MI (US); Tae Sik Kim, Midland, MI (US)

(73) Assignee: MANDO CORPORATION, Gyeonggi-do (KR)

(*) Notice: Subject to any disclaimer, the term of this patent is extended or adjusted under 35 U.S.C. 154(b) by 127 days.

(21) Appl. No.: 16/421,436

(22) Filed: May 23, 2019

(65) Prior Publication Data
US 2020/0373821 A1 Nov. 26, 2020

(51) Int. Cl.
*H02K 1/27* (2006.01)
*H02K 15/03* (2006.01)
*H02K 3/48* (2006.01)
*H02K 1/12* (2006.01)

(52) U.S. Cl.
CPC .............. *H02K 15/03* (2013.01); *H02K 1/12* (2013.01); *H02K 1/27* (2013.01); *H02K 3/48* (2013.01)

(58) Field of Classification Search
CPC .......... H02K 23/00; H02K 23/40; H02K 1/27; H02K 1/276; H02K 21/14; H02K 21/22; H02K 29/03; H02K 1/12; H02K 15/03; H02K 3/48
See application file for complete search history.

(56) References Cited

U.S. PATENT DOCUMENTS

| | | | |
|---|---|---|---|
| 6,700,280 B1* | 3/2004 | Geiger | B60K 6/26 310/193 |
| 6,707,209 B2 | 3/2004 | Crapo et al. | |
| 7,321,177 B2* | 1/2008 | Uchida | H02K 1/2766 310/156.07 |
| 7,932,658 B2 | 4/2011 | Ionel | |
| 7,999,430 B2 | 8/2011 | Hung | |
| 8,174,158 B2 | 5/2012 | Rahman et al. | |
| 2013/0154436 A1* | 6/2013 | Nakano | B62D 5/046 310/216.094 |
| 2013/0334925 A1 | 12/2013 | Uematsu et al. | |

* cited by examiner

*Primary Examiner* — Tran N Nguyen
(74) *Attorney, Agent, or Firm* — Ladas & Parry, LLP

(57) ABSTRACT

A permanent magnet motor (and associated rotor and stator) are described. The motor includes: a rotor having: an outer surface disposed radially from a central axis; and a plurality of permanent magnets located on the outer surface of or within pockets located between the outer surface and the central axis of the rotor; a stator having an inner surface in a spaced apart relationship to the outer surface or the plurality of permanent magnets with a gap there between that varies as a function of axial position along the central axis, and a first gap width at a first axial position is different from a second gap width at a second axial position, and the first and second gap widths are sized and configured to reduce the coping torque of the IPM motor as compared to an IPM motor having a constant gap width of the first or second width.

43 Claims, 13 Drawing Sheets

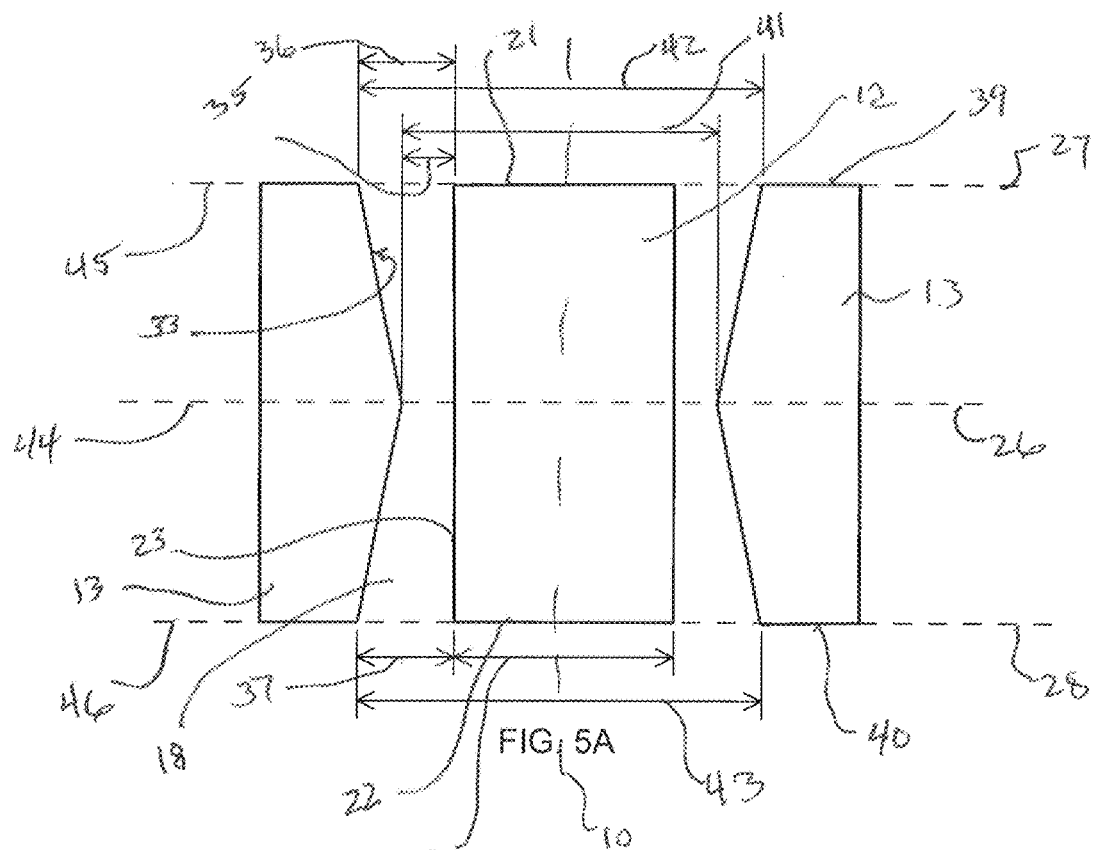

VARIABLE AIR GAP ALONG AXIAL DIRECTION FOR REDUCING COGGING TORQUE IN PERMANENT MAGNET MOTORS

TECHNICAL FIELD

This disclosure relates to electric motors with an emphasis on the configuration of rotors and stators for permanent magnet (PM) motors, such as interior permanent magnet (IPM) motors and surface-mount permanent magnet (SPM) motors.

BACKGROUND

Electric motors, including interior permanent magnet motors and surface-mount permanent magnet motors, operate by way of a rotor rotating in relation to stator under the influence of magnetic interaction between components of the rotor and the stator. As the rotor rotates in relation to the stator, there can be variations in the interactive force/torque between the rotor and stator due to variations in the relevant magnetic fields. One of the torque involved in the relative rotation can be referred to as "cogging torque." Cogging torque can be understood as a torque due to the interaction between magnets (e.g. permanent magnets) and slotting. In some embodiments, the magnets can be associated with the rotor while the slotting can be associated with the stator, and in some embodiments, the magnets can be associated with the stator while the slotting can be associated with the rotor. Sometimes cogging torque can be referred to as detent or "no-current" torque. Generally, cogging torque is undesirable and can be associated with jerkiness and torque ripple of the motor, especially at lower speeds. Accordingly, it can be desirable to reduce the cogging torque for the motor.

SUMMARY

In a first aspect disclosed herein a permanent magnet (PM) motor is provided. The permanent magnet (PM) motor comprising: a rotor comprising: an outer surface disposed radially from a central axis; and a stator in magnetic communication with the rotor, and comprising an inner surface in a spaced apart relationship to the outer surface with a gap there between, wherein, a plurality of magnets forms at least a portion of the outer surface of the rotor or is located within the rotor or forms at least a portion of the inner surface of the stator or is located within the stator, wherein the gap has a width that is measured as one half a difference between an outer diameter of the rotor and a corresponding inner diameter of the stator, that varies as a function of axial position along the central axis, and a first width at a first axial position is different from a second width at a second axial position, and the first and second widths are sized and configured to reduce the cogging torque of the PM motor as compared to an PM motor having a constant gap width of the first or second width.

In a second aspect disclosed herein an interior permanent magnet (IPM) motor is provided. The interior permanent magnet (IPM) motor comprises: a rotor comprising: an outer surface disposed radially from a central axis; and a plurality of pockets located between the outer surface and the central axis; a plurality of permanent magnets located within the plurality of pockets; a stator in magnetic communication with the plurality of permanent magnets and comprising an inner surface in a spaced apart relationship to the outer surface with a gap there between, wherein the gap has a width that is measured as one half a difference between an outer diameter of the rotor and a corresponding inner diameter of the stator, that varies as a function of axial position along the central axis, and a first width at a first axial position is different from a second width at a second axial position, and the first and second widths are sized and configured to reduce the cogging torque of the IPM motor as compared to an IPM motor having a constant gap width of the first or second width.

In a third aspect disclosed herein a rotor for a permanent magnet (PM) motor is provided. The rotor for the permanent magnet (PM) motor comprising: a first and a second end; an outer surface extending between the first and second ends and the outer surface being disposed radially from a central axis; and optionally a plurality of pockets located between the outer surface and the central axis, the plurality of pockets sized and configured to receive a plurality of permanent magnets; wherein the outer surface defines an outer diameter that varies as a function of axial position along the central axis.

In a fourth aspect disclosed herein, a rotor for an interior permanent magnet (IPM) motor is provided. The rotor comprises: a first end a second end; an outer surface extending between the first and second ends and the outer surface being disposed radially from a central axis; a plurality of pockets located between the outer surface and the central axis, the plurality of pockets sized and configured to receive a plurality of permanent magnets; wherein the outer surface defines an outer diameter that varies as a function of axial position along the central axis.

In a fourth aspect disclosed herein a stator for a permanent magnet (PM) motor is provided. The stator for the permanent magnet (PM) motor comprising: a first and a second end; an inner surface extending between the first and second ends; wherein the inner surface defines an inner diameter that varies as a function of linear position between the first and second ends.

In a fifth aspect disclosed herein a stator for an interior permanent magnet (IPM) motor is provided. The stator comprises: a first and a second end; an inner surface extending between the first and second ends; teeth; and slots, wherein the teeth are sized and configured for winding with a conductive coil, and the inner surface defines an inner diameter that varies as a function of linear position between the first and second ends.

BRIEF DESCRIPTION OF THE DRAWINGS

FIG. 5A is a view of an embodiment of a rotor-stator combination.

FIG. 5B is a view of an embodiment of a rotor-stator combination.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Rotating electric motors, including permanent magnet motors, interior permanent magnet (IPM) motors and surface permanent magnet motors (SPM), can operate by a magnetic interaction between a rotor located within a stator. The description provided herein will be based upon interior permanent magnet motors, but the teachings provided can also be directed embodiments that are surface permanent magnet motors. In addition, the descriptions provided herein will be based upon the magnets being located on or within a rotor which is surrounded by a stator that can include coils and can include slotting, but the teachings provided can also be directed to embodiments where the magnets are located on or within the stator and the rotor includes coils and/or slotting.

Figure 1A:
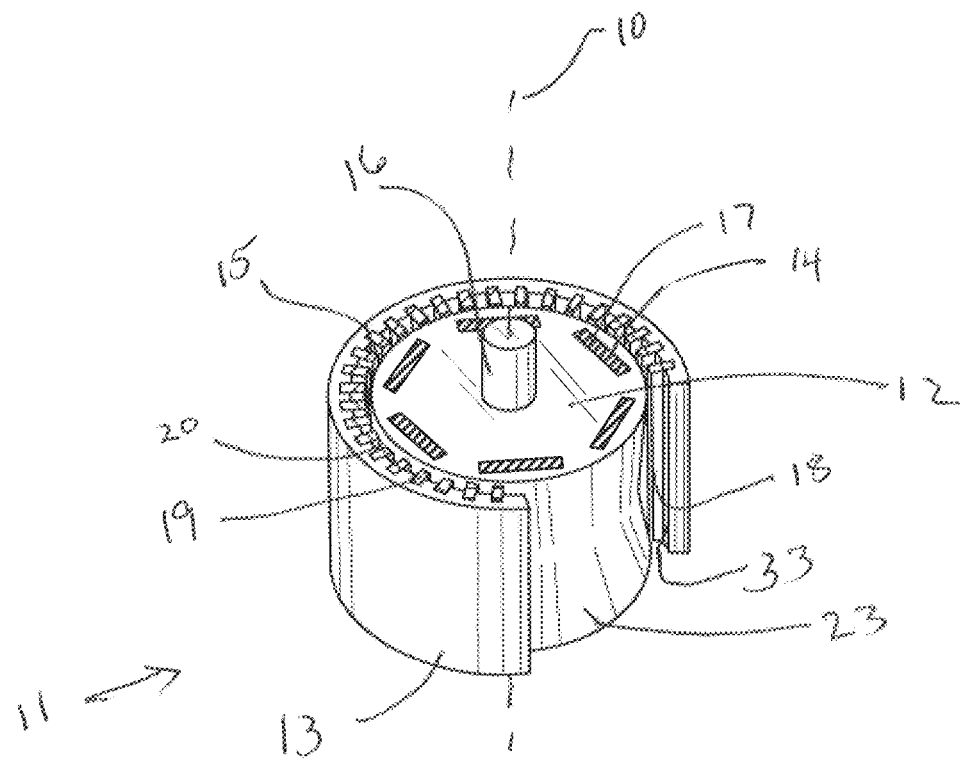
FIG. 1A-1D are schematic diagrams of an embodiments of a motor rotor and stator.
Figure 1D:
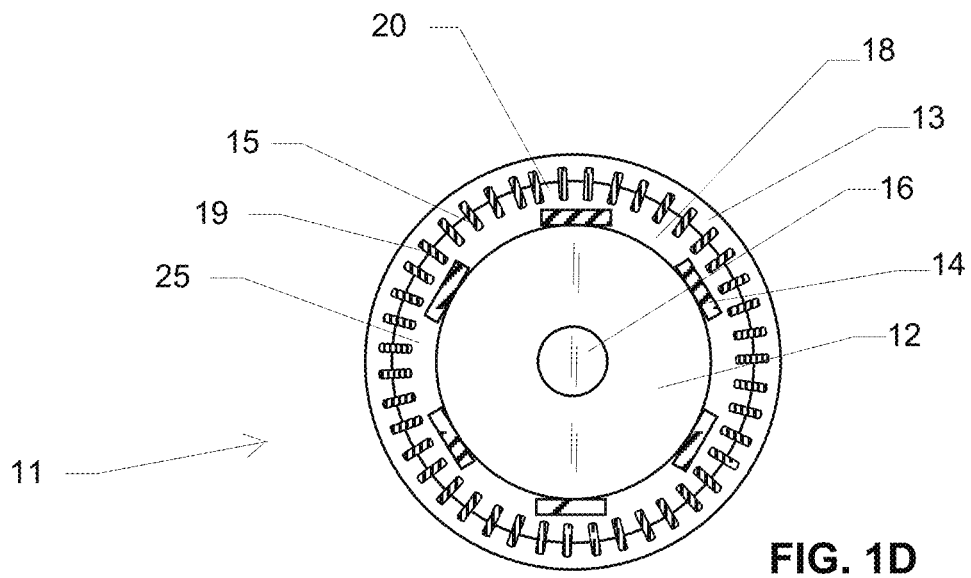
Figure 1B:
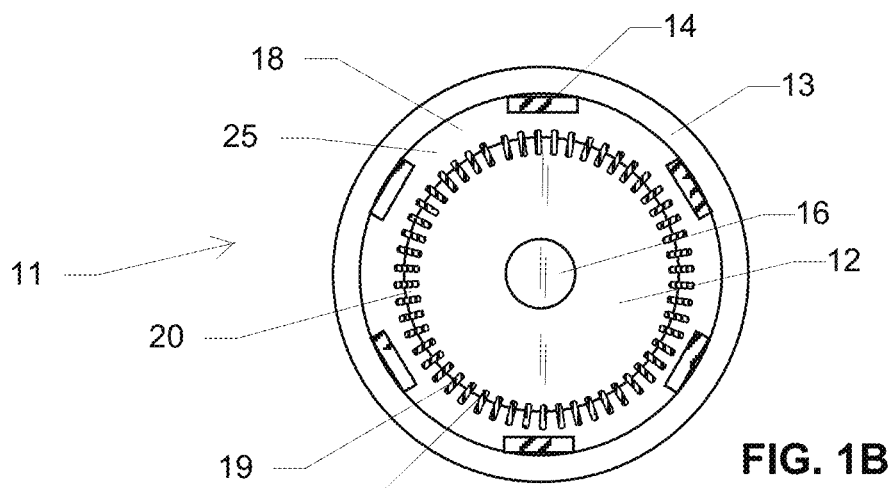
Figure 1C:
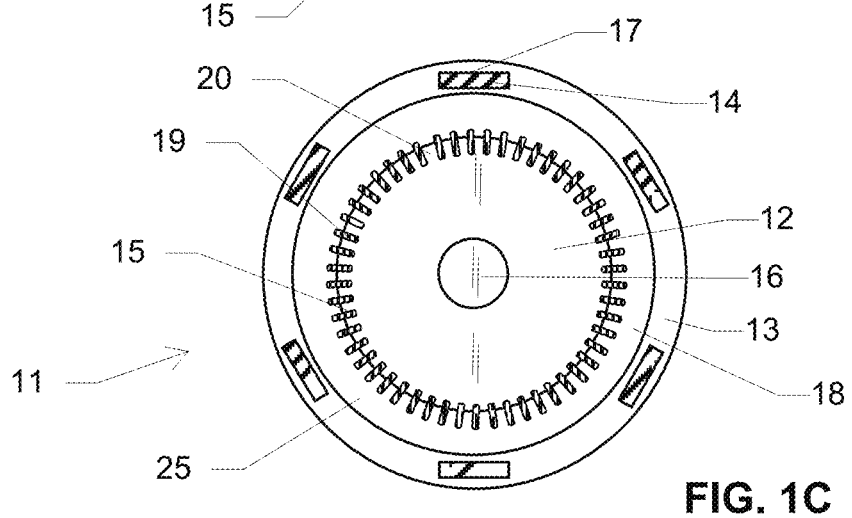

As shown in FIG. 1A, an electric motor 11 includes a rotor 12 mounted to a shaft 16 and surrounded by a stator 13. The rotor 11 includes pockets 17 with magnets 14 located therein. The rotor and shaft rotates about a central axis 10. In additional embodiments, the magnets 14 can be located on an exterior surface of the rotor 12 (see FIG. 1D.) In additional embodiments, the magnets 14 can be located on an interior surface of an opening 25 of the stator 13 or located within pockets within the stator 13 while coils and/or slotting can be located on the rotor 12 (see FIGS. 1B and 1C.)

The stator 13 has an internal surface 33 in close proximity to an outer surface 23 of the rotor 12 with a gap 18 between the inner surface 33 and the outer surface 23. The stator 13 can include alternating teeth 19 and slots 20 on the inner surface 33 with stator windings 15 wound around the teeth 19. In operation, the stator windings 15 in combination with the teeth form of electromagnetic that magnetically interacts with the magnets 14 in rotor 12 to cause the rotor 12 to turn within the stator 13.

Figure 2:
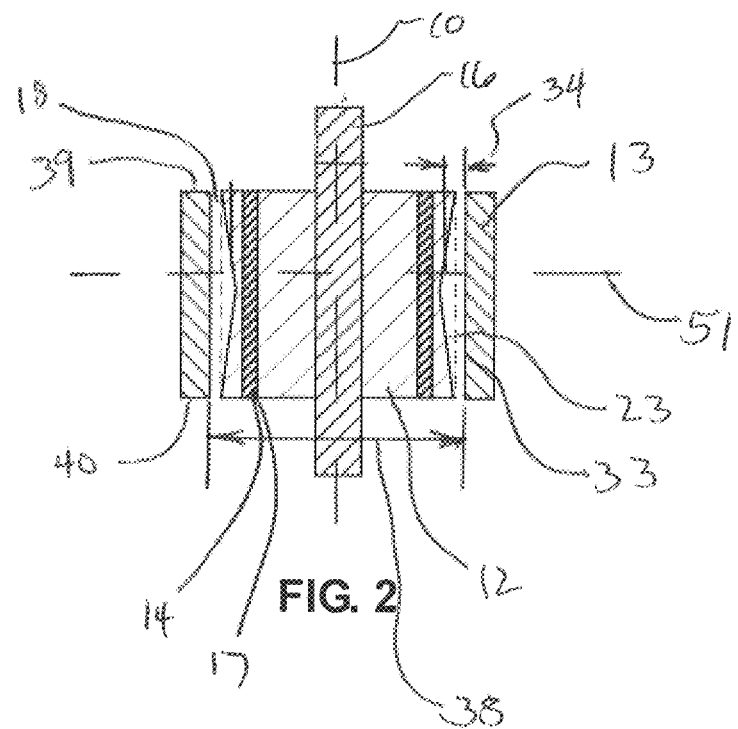
FIG. 2 is a schematic cross-sectional view of an embodiment of a motor rotor and stator.

FIG. 2 shows a schematic of an electric motor in cross-section, with the rotor 12 and shaft 16 located within the stator 13. The rotor 12 and shaft 16 rotate about a central axis 10. The gap 18 between the inner surface 33 of the stator 13 and the outer surface 23 of the rotor 12 shown in FIG. 2 has a variable gap width 34 that varies with axial position 51 corresponding to different positions along central axis 10. In general, the gap width 34 is equal to one half the difference in diameter of the inner surface 33 and the diameter of the outer surface 23. The respective diameters of the inner surface 33 and outer surface 23 can be determined by the diameter of the smallest circle that encompasses the outer surface 23 of the rotor at the axial position 51 or the diameter of the largest circle that is encompassed by the inner surface of the stator 13 at the axial position 51.

Figure 3A:
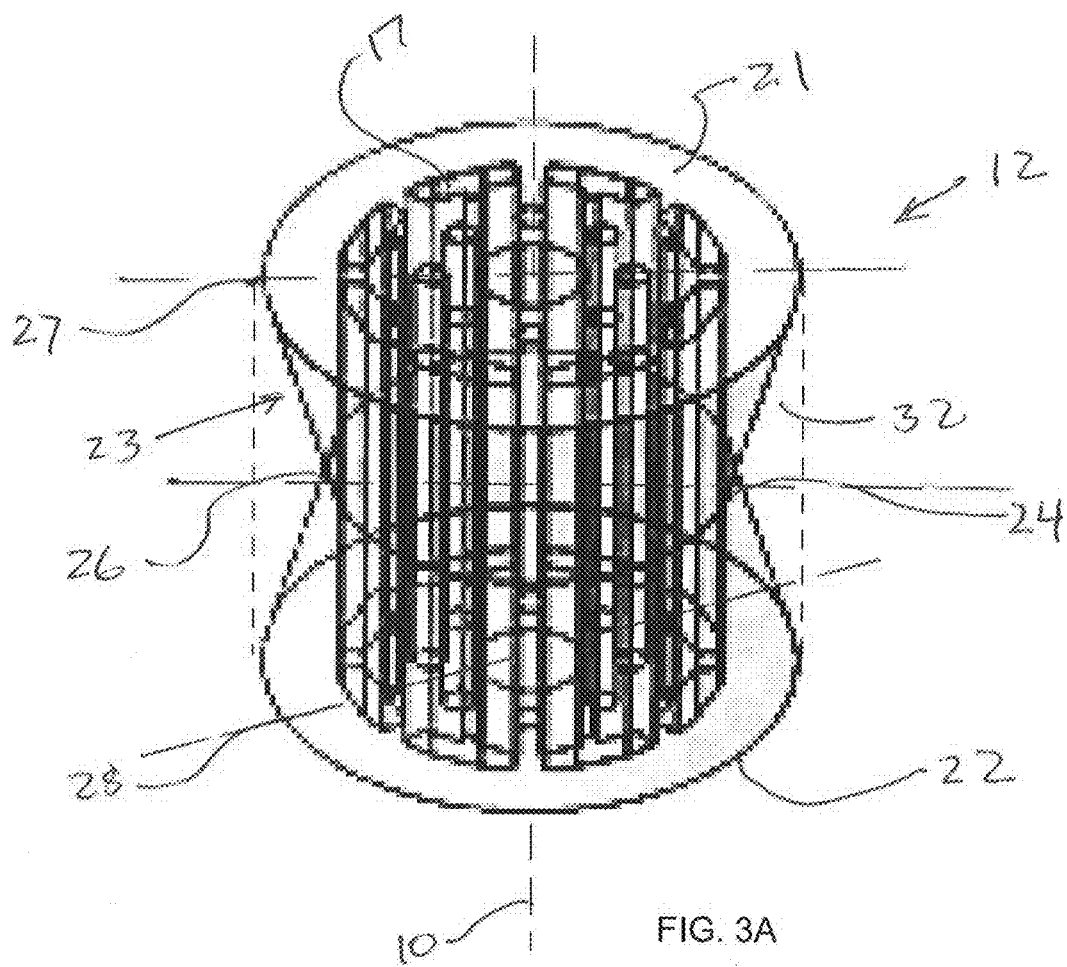
FIG. 3A is a perspective view of an embodiment of a rotor.

In various embodiments of a variable gap 18 between the rotor 12 and stator 13, one or both of the rotor 12 and stator 13 can have varying diameters along their respective axial positions. FIG. 3A shows a perspective view of an embodiment of a rotor 12 with a tapering outer surface 23.

Figure 3B:
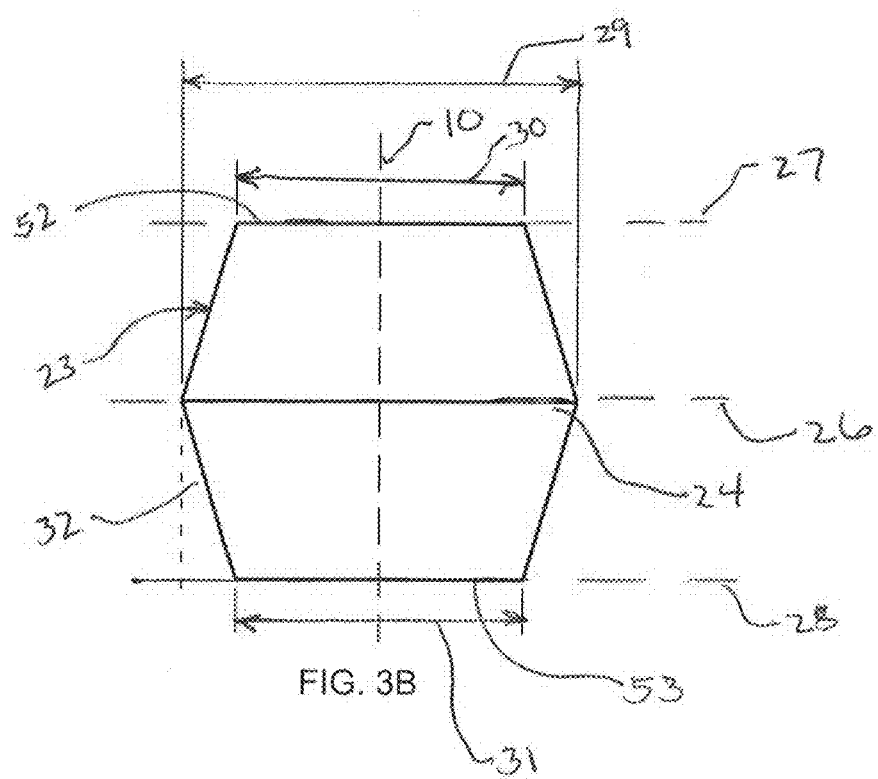
FIG. 3B is a view of an embodiment of a rotor.

FIG. 3B shows an elevation view another embodiment with a tapered outer surface 23. Here, a second axial position 27 is located at a first end 21 of the rotor 12 and a third axial position 28 is located at a second end 22 of rotor 12, with a first axial position 26 is located between the second and third axial positions 27, 28. The diameter 30 of the rotor 12 at the second axial position 27 and the diameter 31 at the third axial position are smaller than the diameter 29 at the first axial position. In some embodiments, the diameter at the second axial position 27 can be equal to or different from the diameter at the third axial position 28. In some embodiments, the first axial position can occur at the midline 24 (a line that is perpendicular to the central axis 10 and passes through a point on the axis that is equidistant from the ends of the rotor) of the rotor where the distance from the first axial position 26 to the second axial position 27 is equal to the distance from the first axial position 26 to the third axial position 28. In some embodiments, the first axial position can occur other than at the midline 24 of the rotor and still be between the second and third axial positions 27, 28.

As shown in FIG. 3A, the diameter at the first axial position 26 is smaller than the diameter at the second axial position 27 or the diameter at the third axial position 28, and the outer surface tapers from the first axial position to the second and to the third axial positions 27, 28.

As shown in FIG. 3B, the diameter at the first axial position 26 is larger than the diameter at the second axial position 27 or the diameter of the third axial position 28, and the outer surface tapers from the second axial position 37 and the third axial position 28 to the first axial position 26.

Figure 3C:
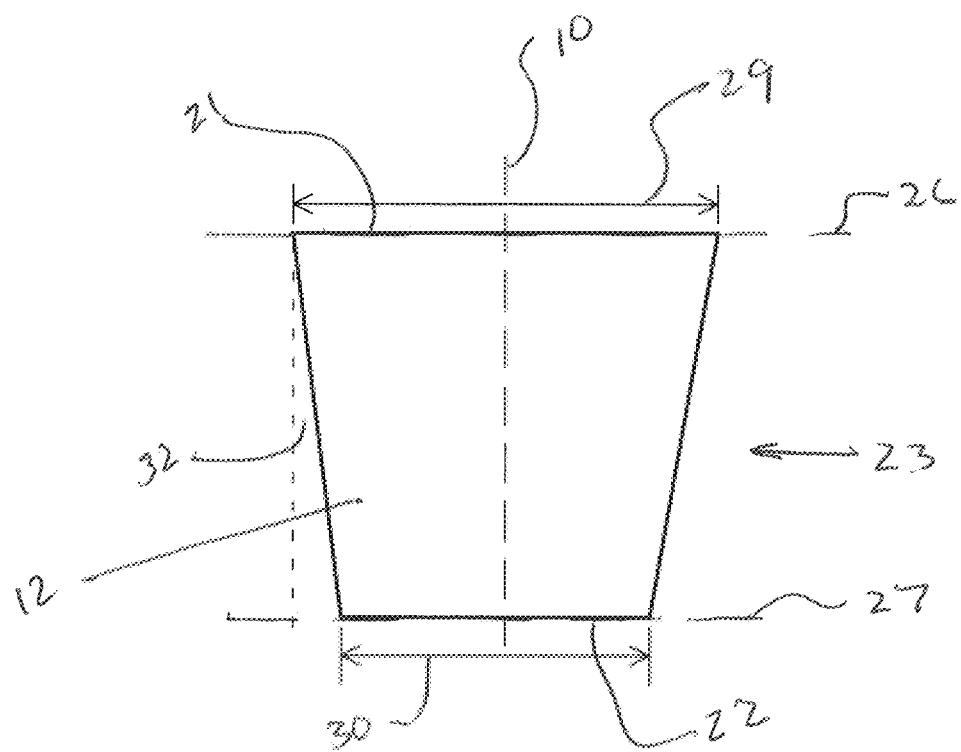
FIG. 3C is a view of an embodiment of a rotor.

FIG. 3C shows the different tapered embodiment of a rotor 12. In the rotor shown in FIG. 3C the outer surface 23 tapers from the second axial position 27 located at a second end 22 to the first axial position 21 located at the first end 21. In this embodiment, the diameter 30 at the second axial position 27 is smaller than the diameter 29 at the first axial position 26.

Figure 4A:
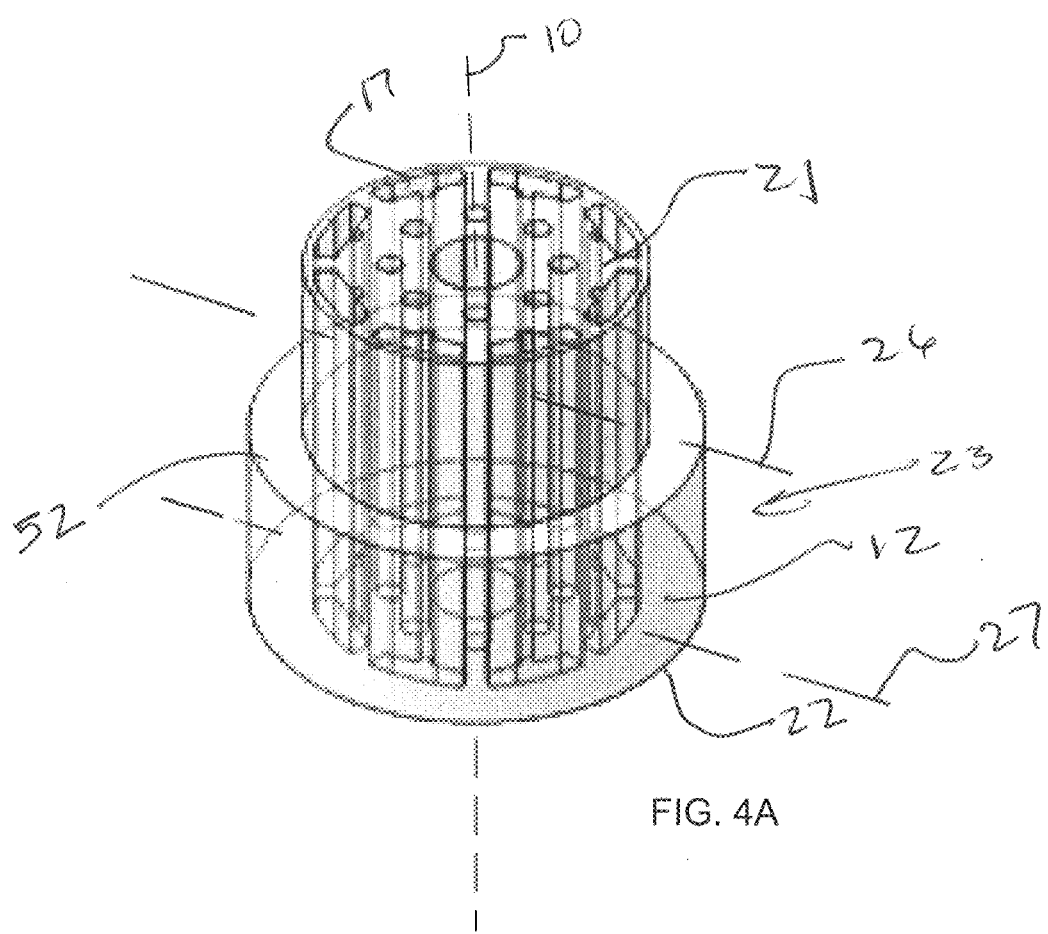
FIG. 4A is a perspective view of an embodiment of a rotor.

FIG. 4A shows an embodiment of a stepped rotor 12. With a stepwise change 52 occurring in the diameter of the outer surface 23 at a location between the first end 21 and the second end 22 of the rotor 12. In this embodiment, the diameter at the first axial position 26 is smaller than the diameter at the second axial position 27. In addition, in the embodiment shown, the diameter is constant between the first end 21 and the stepwise change 52 and equal to the diameter at the first axial position 26. Also, in the embodiment shown, the diameter is constant between the second end 22 and the stepwise change 52 and equal to the diameter at the second axial position 27. However, in some embodiments, one or both of the regions between the first and second ends and the step change can be tapered, such as by tapering toward or away from the stepwise change 52, with a tapered each region being determined independently.

Figure 4B:
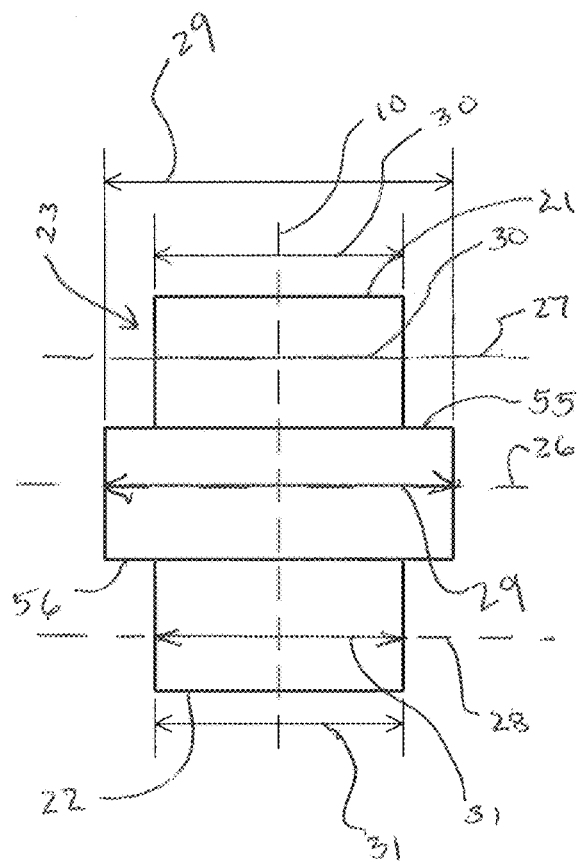
FIG. 4B is a view of an embodiment of a rotor.
Figure 4C:
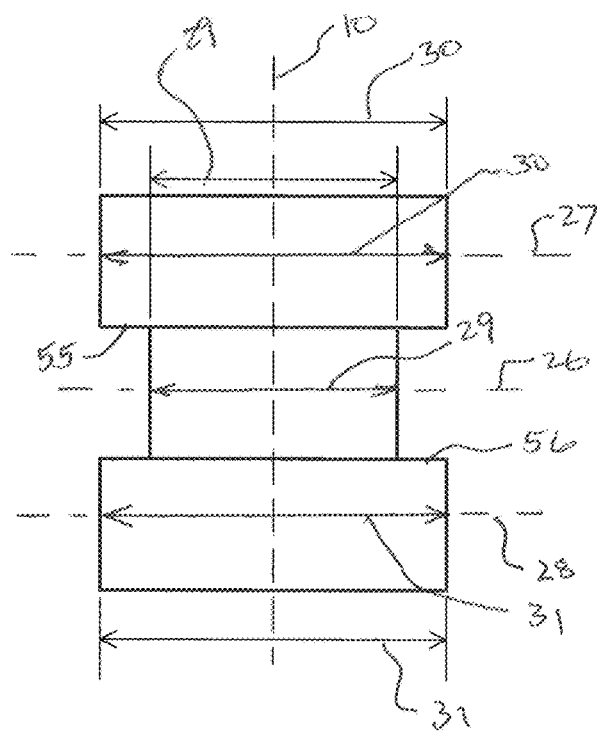
FIG. 4C is a view of an embodiment of a rotor.

FIGS. 4B and 4C show additional embodiments of a rotor 12 with stepwise changes in diameter. FIG. 4B shows the diameter 29 at the first axial position 26 between a larger than the diameter 30 at the second axial position 27 and the diameter 31 at the third axial position 28. As shown in FIG. 4B, the portion of the surface 23 between the first end 21 and a first stepwise transition 55 in diameter progressing toward the second end 22 is parallel to the central axis 10, but in various other embodiments, this portion of outer surface 23 can be tapered toward the first end or toward the first stepwise transition. The section of outer surface 23 between the first stepwise transition 55 and a second stepwise transition 56 between the first stepwise transition 55 and the second end 22 can be parallel to the central axis 10, as shown in FIG. 4B or can be tapered toward the first stepwise transition 55 or the second stepwise transition 56. The portion of outer surface 23 between the second stepwise transition 56 and the second end 22 can be parallel to the central axis 10 as shown in FIG. 4B, or it can be tapered toward the second stepwise transition 56 or the second end 22. In various embodiments, each of these sections can be selected as parallel or tapered in one direction or the other independent of each of the others.

FIG. 4C shows an embodiment of a rotor 12 where the first axial position 26 is located between the second axial position 27 and the third axial position 28. The diameter 29 at the first axial position 26 is smaller than the diameter 30 at the second axial position 27 or the diameter 31 at the third axial position 28. As shown in FIG. 4C, the portion of the surface 23 between the first end 21 and a first stepwise transition 55 in diameter progressing toward the second end 22 is parallel to the central axis 10, but in various other embodiments, this portion of outer surface 23 can be tapered toward the first end or toward the first stepwise transition. The section of outer surface 23 between the first stepwise transition 55 and a second stepwise transition 56 between the first stepwise transition 55 and the second end 22 can be parallel to the central axis 10, as shown in FIG. 4C or can be tapered toward the first stepwise transition 55 or the second stepwise transition 56. The portion of outer surface 23 between the second stepwise transition 56 and the second end 22 can be parallel to the central axis 10 as shown in FIG. 4C, or it can be tapered toward the second stepwise transition 56 or the second end 22. In various embodiments, each of these sections can be selected as parallel or tapered in one direction or the other independent of each of the others.

FIGS. 2, 3A, 3B, 3C, 48, 4B and 4C show embodiments where rotor 12 has a varying outside diameter. However in additional embodiments the inner surface 33 of stator 13 can and inside diameter 38 that varies along axial position along central axis 10, or stated otherwise as varying along the position between a first end 39 of rotor 13 and a second end 40 of rotor 13. In various embodiments the types of changes in diameter described herein for outer surface 23 of rotor 12 can also be applied to the inner surface 33 of stator 13. In some embodiments, any shape outer surface 23 of rotor 12, such as those described herein or one that is parallel to central axis 10 over its entire surface, can be paired with any shape inner surface 33 of stator 13, such as those described herein or that is parallel to central axis 10.

FIG. 5A shows an embodiment where the diameter 41 at a first linear position 44 between the first end 39 and the second end 40 of the stator is smaller than the diameter 42 at a second linear position 45 located at the first end 39 of the stator 13 and is smaller than the diameter 43 at the third linear position 46 located at the second end 40 of stator 13. As shown in FIG. 5A, the first linear position 44 is located between the second linear position 45 and the third linear position 46. Also as shown in the embodiment of FIG. 5A, the stator is paired with a rotor having an outer surface 23 parallel to the central axis 10 (with a constant outside diameter 62), and the gap width 35 at the first axial position 26 (and at the first linear position 44) is smaller than the gap with 36 at the second axial position 27 (and at the second linear position 45) and the gap width 37 at the third axial position 28 (and at the third linear position 46.)

FIG. 5B shows an embodiment of a rotor-stator combination similar to that shown in FIG. 5A, except that the rotor 12 has a varying outside diameter and the stator 13 has an inside diameter 61 that is parallel to the central axis 10, and the diameter 29 of the rotor at the first axial position 26 is larger than the diameter 30 at the second axial position 27 and the diameter 30 at the third axial position 28. The variations in the gap width as a function of linear position or axial position are the same as in FIG. 5A.

Figure 6A:
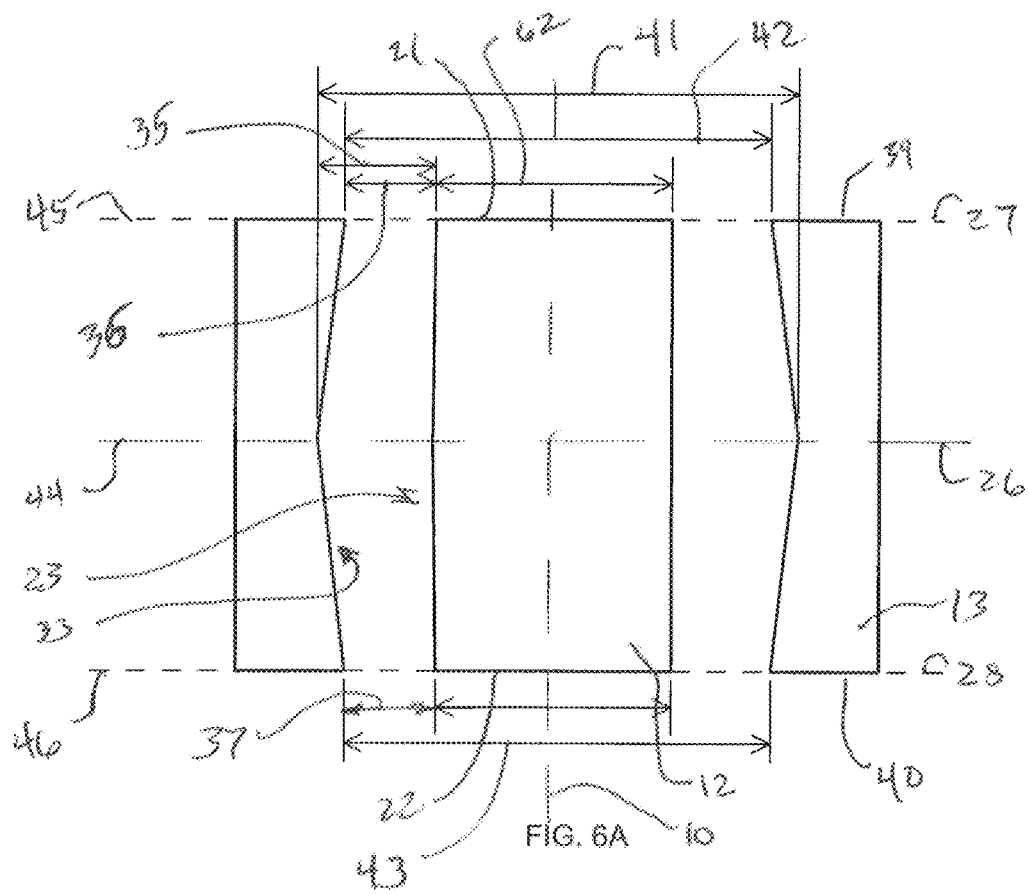
FIG. 6A is a view of an embodiment of a rotor-stator combination.

FIG. 6A shows an embodiment of a rotor 12 and stator 13 similar to that shown in FIG. 5A except that the direction of taper for the inner surface 33 of stator 13 is reversed, with the diameter 41 at the first linear position 44 (corresponding to first axial position 26) is larger than the diameter 42 at the second linear position 45 (corresponding to the second axial position 27 and the first end 39) and the diameter 43 at the third linear position 46 (corresponding to the third axial position 28 and the second end 40.) Accordingly, in the embodiment shown in FIG. 6A where a stator 13 with an inner diameter that varies with the linear position between a first end 39 and the second end 40 is paired with an embodiment of a rotor 12 with an outer surface 23 that is parallel to the central axis 10, the gap width 35 at the first linear position 44 (corresponding to the first axial position 26) is larger than the gap width 36 at the second linear position 45 (corresponding to the second axial position 27) and the gap width 37 at the third linear position 46 (corresponding to the third axial position 28.)

Figure 6B:
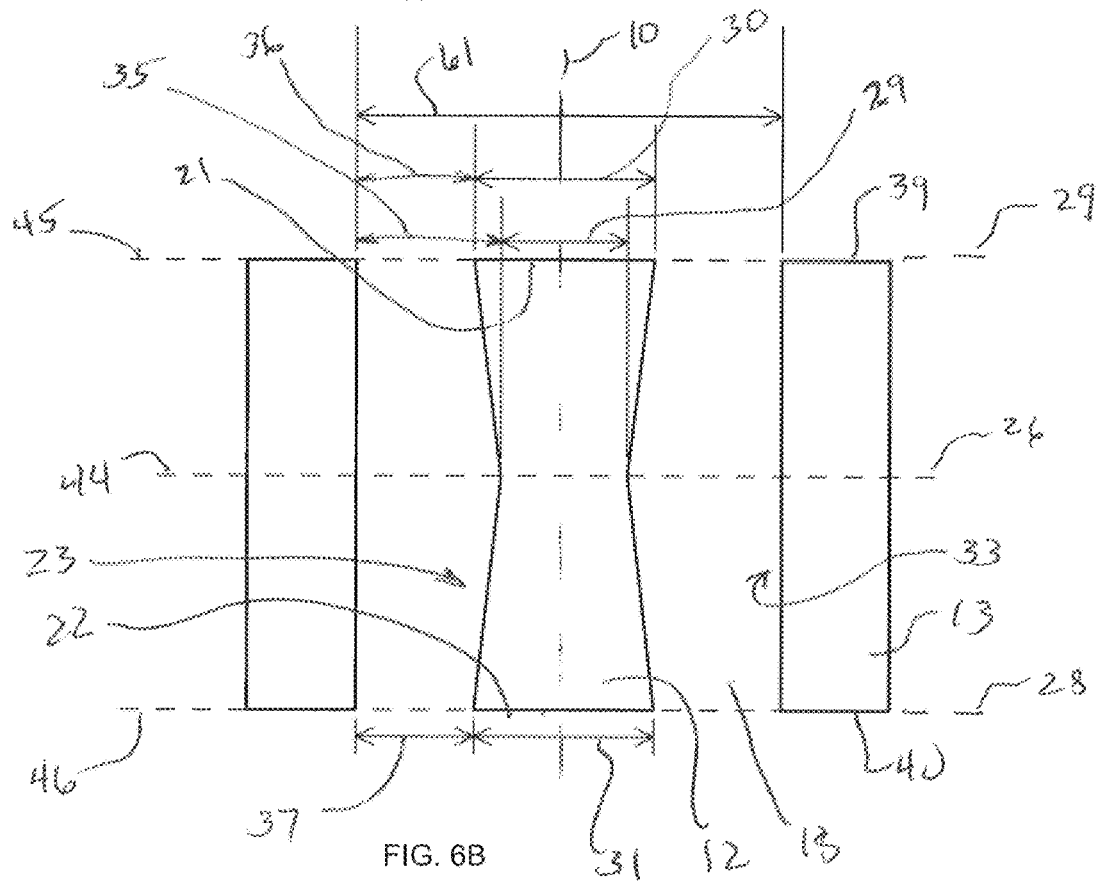
FIG. 6B is a view of an embodiment of a rotor-stator combination.

FIG. 6B shows an embodiment of a rotor 12 and stator 13 similar to that shown in FIG. 5B except that the direction of taper for the outer surface 23 of rotor 12 is reversed, with the diameter 29 at the first axial position 26 is smaller than the diameter 30 at the second axial position 27 and the diameter 31 at the third axial position 28. Accordingly, in the embodiment shown in FIG. 6B where a stator 12 with an outer diameter that varies with the axial position is paired with an embodiment of a stator 13 with an inner surface 33 that is parallel to the central axis 10, the gap width 35 at the first axial position 26 is larger than the gap width 36 at the second axial position 27 and the gap width 37 at the third axial position 28.

Figure 7A:
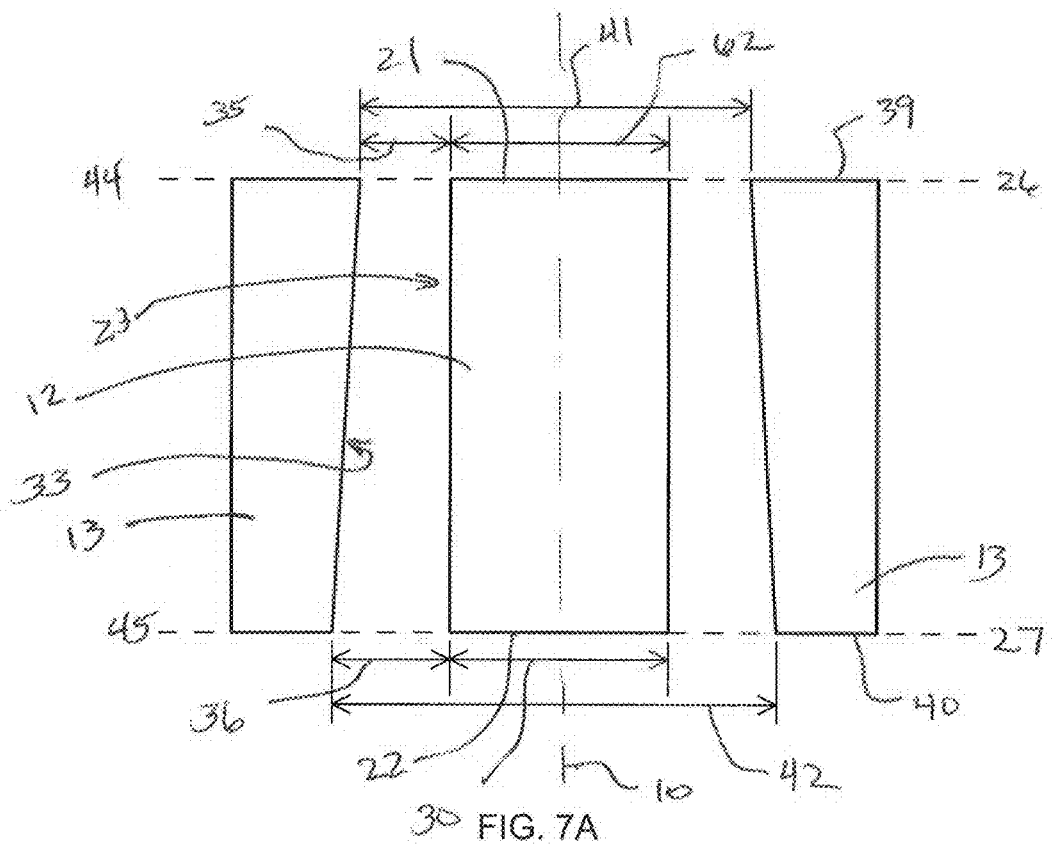
FIG. 7A is a view of an embodiment of a rotor-stator combination.

FIG. 7A shows an embodiment of a rotor 12 and stator 13 where the inner surface 33 of the stator 13 tapers from the second end 42 the first end 39, and the outer surface 23 of rotor 12 is parallel to central axis 10 for the entire outer surface. In the embodiment shown in FIG. 7A, the inner diameter 41 at the first linear position 44 (corresponding to first end 39 and first axial position 26) of inner surface 33 of rotor 13 is smaller than the inner diameter 42 at the second linear position 45 (corresponding to the second end 40 and the second axial position 27) of inner surface 33 of rotor 13. Accordingly, the gap width 35 is smaller at the first linear position 44 then at the second linear position 45.

Figure 7B:
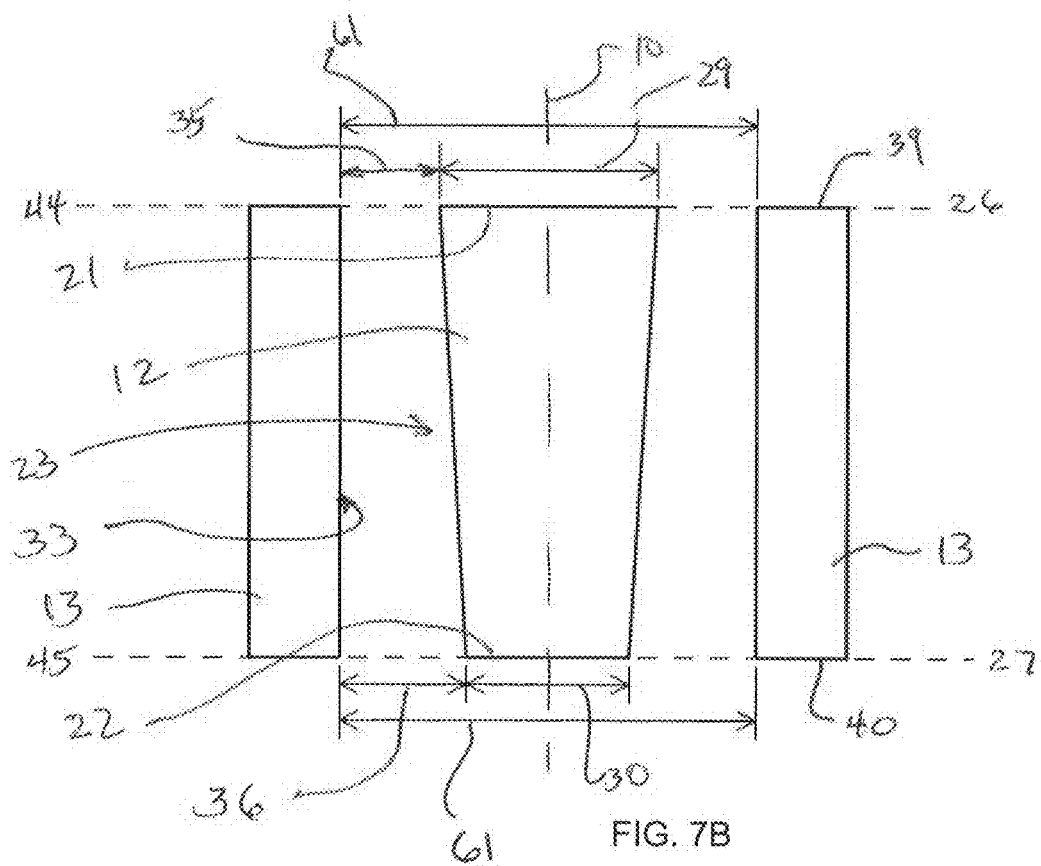
FIG. 7B is a view of an embodiment of a rotor-stator combination.

FIG. 7B shows an embodiment of a rotor-stator combination similar to that shown in FIG. 7A, except that the rotor 12 has a varying outside diameter (tapered) and the stator 13 has an inside diameter that is parallel to the central axis 10, and the diameter 29 of the rotor at the first axial position 26 is larger than the diameter 30 at the second axial position 27. The variations in the gap width as a function of linear position or axial position are the same as in FIG. 5A.

Figure 8:
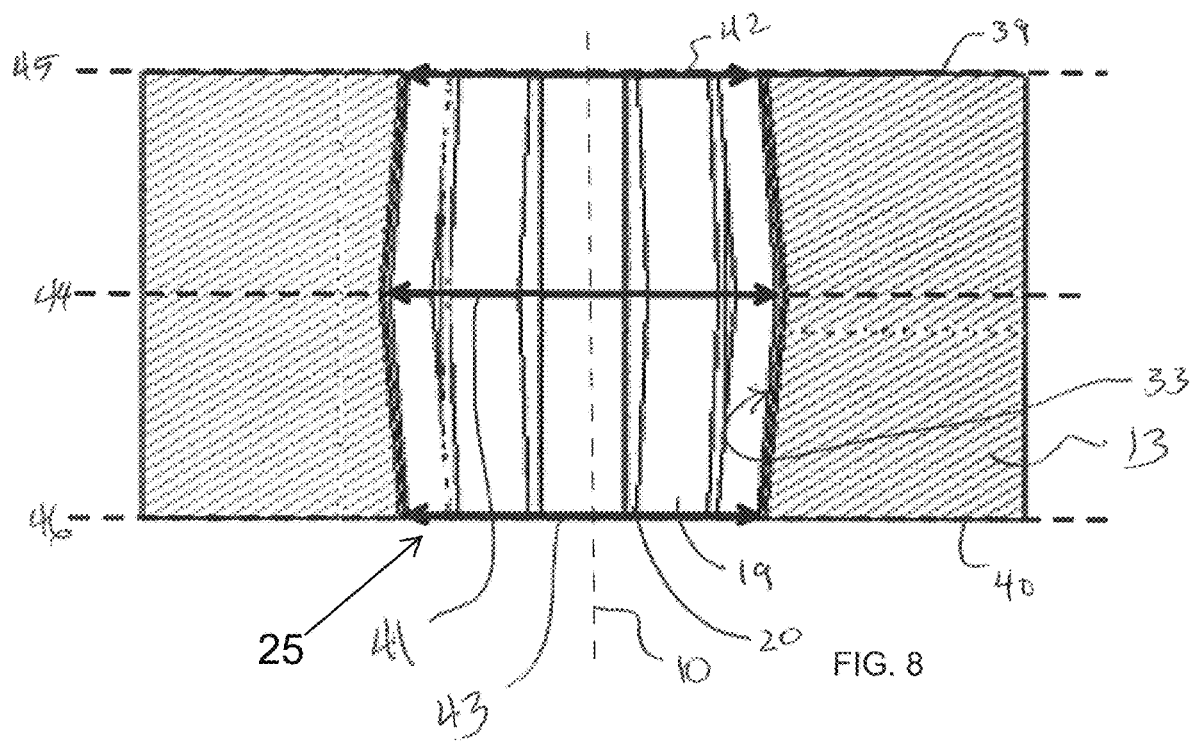
FIG. 8 is a view of an embodiment of a stator.

FIG. 8 shows an embodiment of a stator 13 without a rotor 12 being shown within the stator opening 25. The embodiment of a stator 13 shown in FIG. 8 is similar to the embodiment shown in FIG. 6A, with the inner surface 33 of stator 13 having an inside diameter that varies with linear position between the first end 39 and second end 40 with the inside diameter 41 at a first axial position 26 (corresponding to a first linear position 44 between the first end 39 and the second end 40 of stator 13) being larger than the inside diameter 41 at a second axial position 27 (corresponding to a second linear position 44 corresponding to first end 39 of stator 13) and inside diameter 42 and the third axial position 28 (corresponding to a third linear position 45 corresponding to a second end 40 of stator 13.) Shown in FIG. 8, the first axial position 26 is located between the second axial position 27 and the third axial position 28, and can optionally be located at the midline of stator 13.

Figure 9:
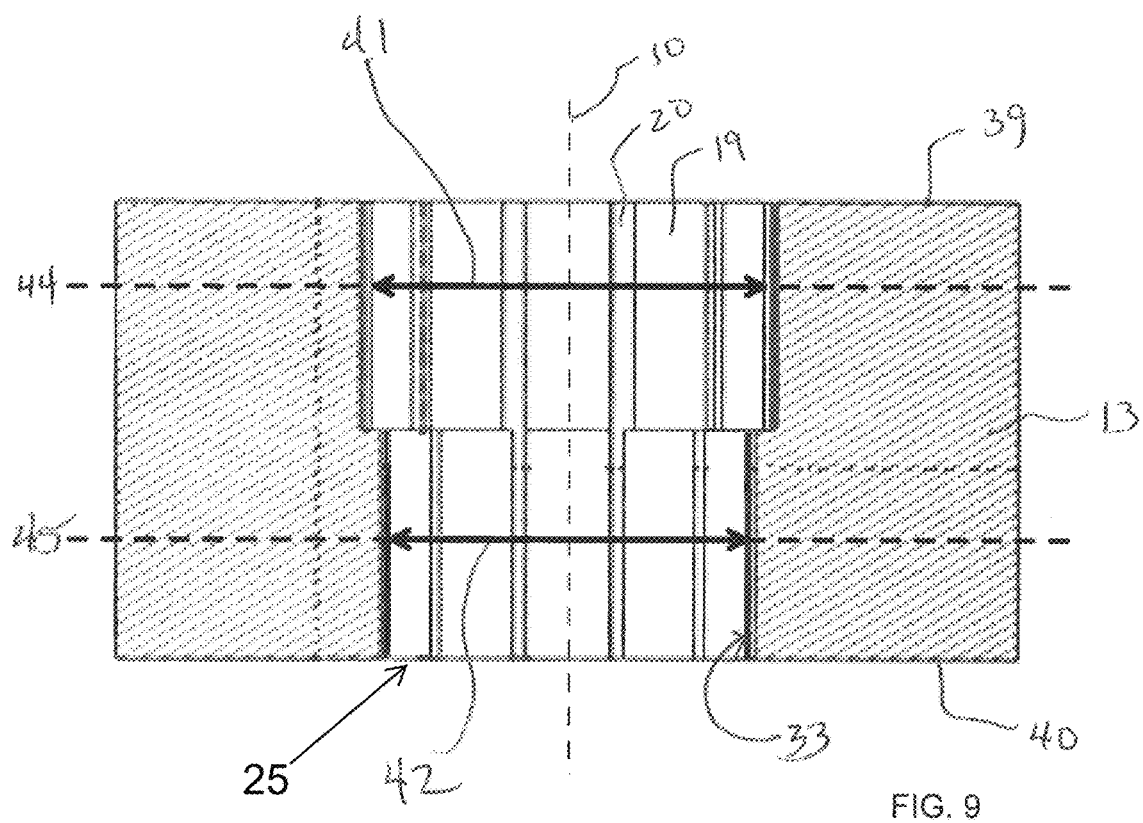
FIG. 9 is a view of an embodiment of a stator.

FIG. 9 shows an embodiment of a stator 13 without a rotor 12 being shown within the stator opening 25. The embodiment of a stator 13 shown in FIG. 9 has a stepped inner surface 33, with an inside diameter 29 at a first axial position 26 (or first linear position 44 between first end 39 and second end 40 of rotor 13) and an inside diameter 30 at a second axial position 27 (or second linear position 45 between first end 39 and second end 40 of rotor 13.) In the embodiment shown in FIG. 9, the inside diameter at the first axial position 26 is larger than the inside diameter 30 at second axial position 27. In various embodiments, the stepwise change can occur at a midline of the stator or at a position other than the midline of the stator.

Figure 10:
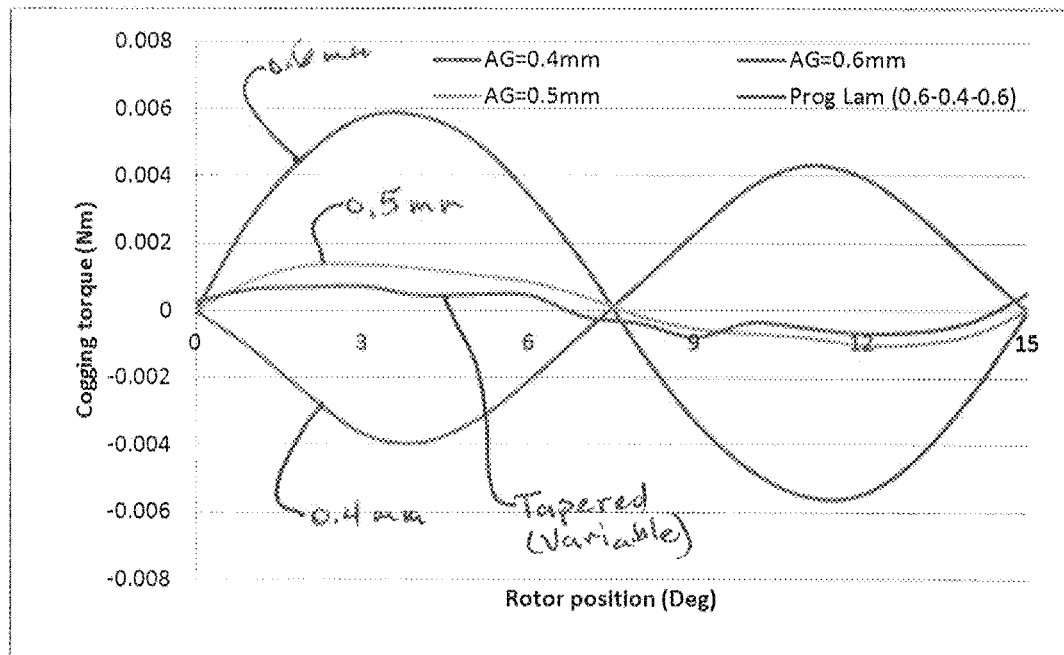
FIG. 10 is a response curve for modeled results.

FIG. 10 shows a modeled response curve of the cogging torque versus rotor position for constant gap widths of 0.4, 0.5 and 0.6 mm and a tapered gap width where the gap width varies from 0.6 mm at both ends of the rotor and 0.4 mm at the midline. This graph shows a very high cogging torque for both 0.4 mm and 0.6 mm gaps. Also, the curves for the 0.4 and 0.6 mm gaps are out of phase from one another by one half of a cycle, and accordingly would at least partially cancel one another if combined in a single rotor/stator structure. For the embodiment modeled in FIG. 10, the average gap for the 0.4 and 0.6 mm gaps would be 0.5 mm. The cogging torque curve for a 0.5 mm gap is also shown in FIG. 10, and the magnitude of the cogging torque is less than results for 0.4 mm and 0.6 mm gaps. Also shown in FIG. 10 is a curve for the modeled results of a 0.6-0.4-0.6 mm stepped gap structure, with the curve following closely the curve for the 0.5 mm gap, and in the embodiment modeled, lower cogging torque than the 0.5 mm gap.

For the modeling done in FIG. 10 (and in the other modeled results presented herein), Flux 3D from Altair® HyperWorks® (Troy, Mich., USA) was used.

One advantage of using a variable-sized gap (such as a variable rotor diameter) along the axial position over a constant width air gap is that a variable-sized gap can act as an active compensation method to ensure lower cogging torque. In addition, the use of a fixed, or constant, width gap, manufacturing variability in the gap actually achieved can result in higher than expected cogging torque, with a variable-sized gap offering the potential for more consistent cogging torque in the manufactured product. This use of a variable-sized gap between the rotor and stator can be applied to rotor-stator combinations of any length, and the specific topography of the gap-sized variations can be of any type, including, but not limited to, those discussed herein.

In addition, while magnets of varying shape can be used with the rotors, stators and gaps discussed herein, the use of magnets being "axially straight" (meaning that they have a constant cross-sectional area along their axial position on the rotor) can render the design easy to manufacture with reduced manufacturing cost over other shaped magnets. In addition, the rotor (and/or stator) can be made as one piece or as a laminated structure. (As used herein, a stepped structure has variations in the width or diameter that are greater than that associated with manufacturing tolerances. In some embodiments, the variation in width or diameter for a stepped structure can be greater than 100μ or greater than 200μ or greater than 300μ or greater than 400μ as measured between one width or diameter as compared to another width or diameter.)

Figure 11:
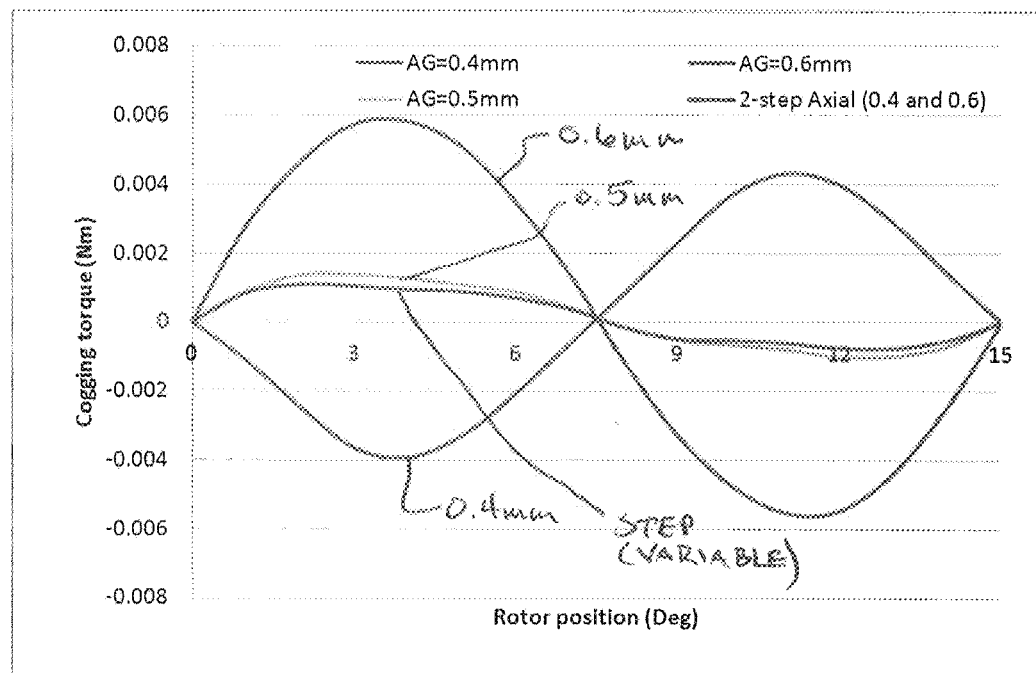
FIG. 11 is a response curve for modeled results.

FIG. 11 shows a modeled response curve of the cogging torque versus rotor position for constant gap widths of 0.4, 0.5 and 0.6 mm and a variable gap width where the gap width has a single stepwise change from 0.4 to 0.6 mm. This graph shows a very high cogging torque for both 0.4 mm and 0.6 mm gaps. Also, the curves for the 0.4 and 0.6 mm gaps are out of phase from one another by one half of a cycle, and accordingly would at least partially cancel one another if combined in a single rotor/stator structure. For the embodiment modeled in FIG. 10, the average gap for the 0.4 and 0.6 mm gaps would be 0.5 mm. The cogging torque curve for a 0.5 mm gap is also shown in FIG. 11, and the magnitude of the cogging torque is less than results for 0.4 mm and 0.6 mm gaps. Also shown in FIG. 10 is a curve for the modeled results of a 0.4-0.6 mm stepped gap structure, with the curve following closely the curve for the 0.5 mm gap, and in the embodiment modeled, lower cogging torque than the 0.5 mm gap. (In all of the modeled results presented herein, the magnets are not skewed in the axial direction.)

Figure 12:
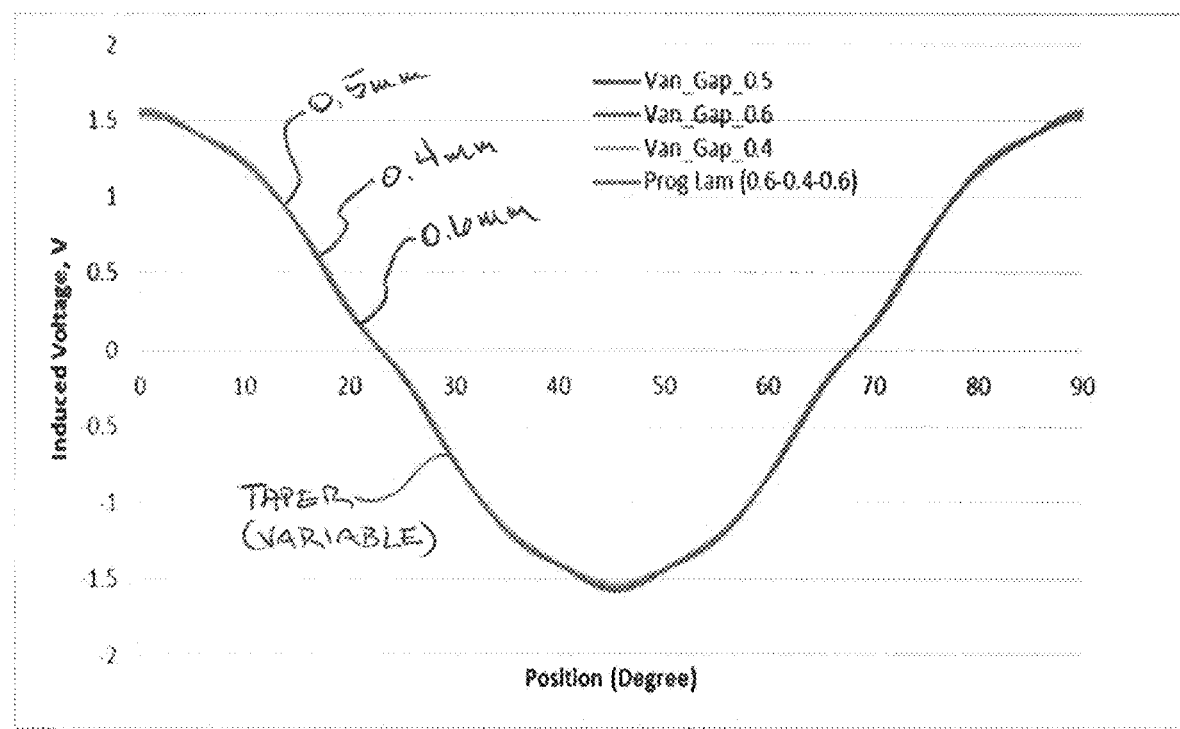
FIG. 12 is a response curve for modeled results.
Figure 13:
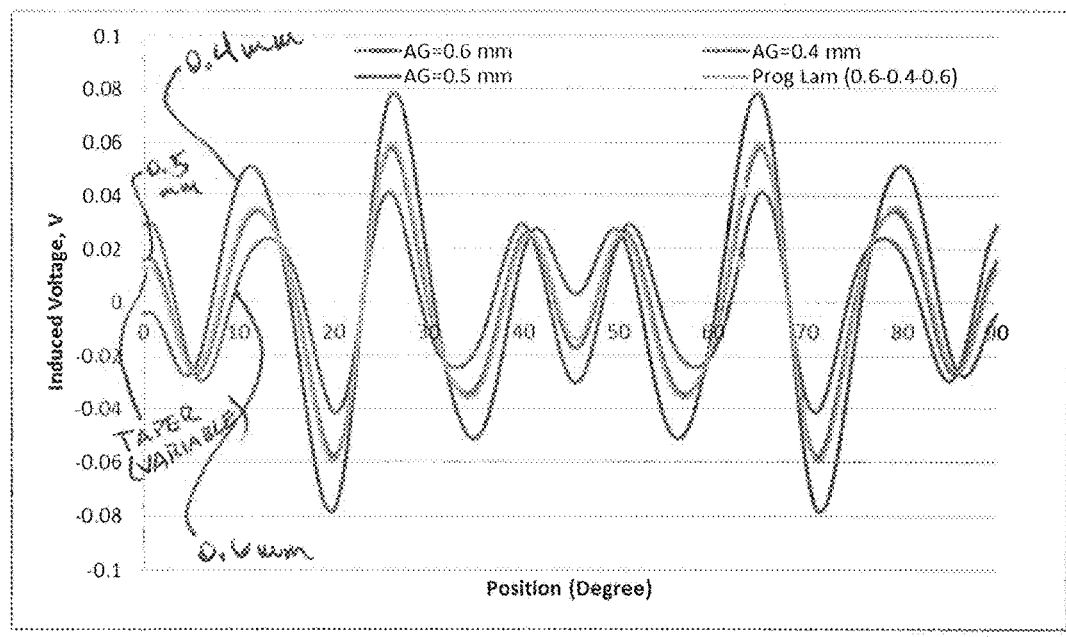
FIG. 13 is a response curve for modeled results.

FIG. 12 shows the modeled results for induced voltage for constant gap widths of 0.4, 0.5 and 0.6 mm and a tapered gap width where the gap width varies from 0.6 mm at both ends of the rotor and 0.4 mm at the midline. As shown in FIG. 12, the induced voltage is virtually indistinguishable between the different shapes. FIG. 13 shows induced harmonic voltage other than the fundamental component is a function of rotor position. For both FIGS. 12 and 13, there is negligible effect on fundamental and harmonic induced voltage. Therefore, the average torque and the ripple will not vary significantly in the proposed design from constant gap-width designs. This is true for stepped structures (single step and multiple step; steps apply to rotor and/or stator) and to tapered structures (single taper and multiple taper; taper applied to rotor and/or stator) and for combinations of stepped and tapered structures.

Figure 14:
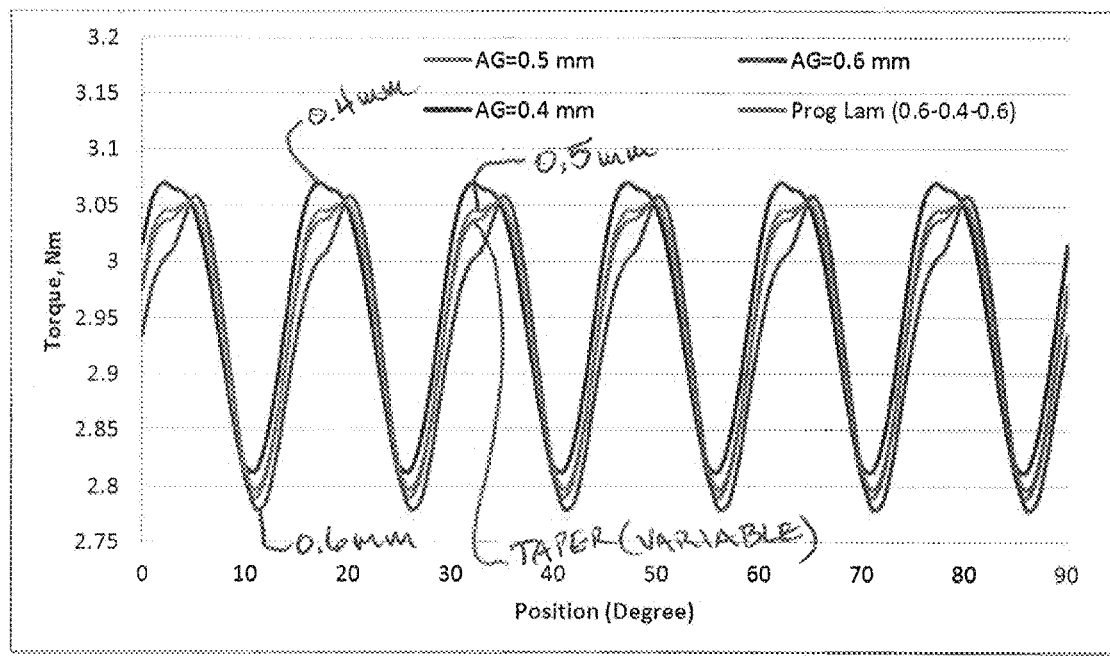
FIG. 14 is a response curve for modeled results.

FIG. 14 modeled results for torque versus rotor position for constant gap widths of 0.4, 0.5 and 0.6 mm and a tapered gap width where the gap width varies from 0.6 mm at both ends of the rotor and 0.4 mm at the midline. As can be seen in FIG. 14, the tapered gap width has negligible effect on the average torque and its ripple. This is true for stepped structures (single step and multiple step; steps apply to rotor and/or stator) and to tapered structures (single taper and multiple taper; taper applied to rotor and/or stator) and for combinations of stepped and tapered structures.

As used herein reference is made to variations in diameters and variations in gap width. Such variations are variations that are greater than that associated with manufacturing tolerances, and can be applied to both stepped structures (rotor, stator or both) as well as tapered structures (rotor, stator or both) as well as structures that include combinations of stepped and tapered portions. In some embodiments, such as structures that are made by lamination, a stepped structure can have a variation in width or diameter greater than 100μ or greater than 200μ or greater than 300μ or greater than 400μ as measured between one width or diameter as compared to another width or diameter. In some embodiments, a tapered structure can have a variation in width or diameter greater than 100μ or greater than 200μ or greater than 300μ or greater than 400μ as measured between a local maxima and a local minimum. In some embodiments, a tapered structure can have a linearly tapered structure (the first derivative of width or diameter with respect to axial position is a constant or approximates a constant) or can have a taper that varies (the first derivative of width or diameter with respect to axial position is not a constant.)

As used herein, the words "approximately", "about", "substantially", "near" and other similar words and phrasings are to be understood by a person of skill in the art as allowing for an amount of variation not substantially affecting the working of the device, example or embodiment. In those situations where further guidance is necessary, the degree of variation should be understood as being 5% or less.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims.

The invention claimed is:

1. A permanent magnet (PM) motor comprising:
   a rotor comprising:
      a plurality of permanent magnets;
      an outer surface disposed radially from a central axis; and
      a plurality of magnets forming a portion of the outer surface or located within pockets between the outer surface and the central axis;
   a stator in magnetic communication with the plurality of permanent magnets and comprising an inner surface in a spaced apart relationship to the outer surface with a gap therebetween,
   wherein the gap has a width that is measured as one half a difference between an outer diameter of the rotor and a corresponding inner diameter of the stator, that varies as a function of axial position along the central axis, and
   a first width at a first axial position is different from a second width at a second axial position, and the first and second widths are sized and configured to reduce the cogging torque of the PM motor as compared to an PM motor having a constant gap width of the first or second width.

2. The PM motor of claim 1, wherein a third width of the gap at a third axial position is different from one of the first and second widths, and the third gap is sized and configured to reduce the cogging torque of the PM motor as compared to an PM motor having a constant gap width of the first, second or third width.

3. The PM motor of claim 1, wherein a third width of the gap at a third axial position is equal to one of the first and second widths, and the third gap is sized and configured to reduce the cogging torque of the PM motor as compared to an PM motor having a constant gap width of the first, second or third width.

4. The PM motor of claim 1, wherein the transition from the first width to the second width occurs step-wise.

5. The PM motor of claim 1, wherein the gap tapers from the first width to the second width.

6. The PM motor of claim 1, wherein the first width is smaller than the second width, and a third width of the gap at a third axial position is equal to the first width, and the first axial position is located between the second and third axial positions.

7. The PM motor of claim 1, wherein the first width is larger than the second width, and a third width of the gap at a third axial position is equal to the second width, and the first axial position is located between the second and third axial positions.

8. The PM motor of claim 4, wherein the first width is smaller than the second width, and a third width of the gap at a third axial position is equal to the second width, and the first axial position is located between the second and third axial positions.

9. The PM motor of claim 4, wherein the first width is larger than the second width, and a third width of the gap at a third axial position is equal to the first width, and the first axial position is located between the second and third axial positions.

10. The PM motor of claim 1, wherein the first width is larger than the second width,
    and a third width of the gap at a third axial position is equal to the first width, and the first axial position is located between the second and third axial positions.

11. The PM motor of claim 5, wherein the first width is smaller than the second width, and a third width of the gap at a third axial position is equal to the second width, and the first axial position is located between the second and third axial positions.

12. The PM motor of claim 6, wherein the second axial position occurs at a first end of the rotor and the third axial position occurs at a second end of the rotor and the first axial position occurs between the first and second ends of the rotor.

13. The PM motor of claim 12, wherein the first axial position occurs at a midline of the rotor.

14. The PM motor of claim 9, wherein the second axial position occurs at a first end of the rotor and the third axial position occurs at a second end of the rotor and the first axial position occurs between the first and second ends of the rotor.

15. The PM motor of claim 14, wherein the first axial position occurs at a midline of the rotor.

16. The PM motor of claim 1, wherein:
the rotor comprises a first and a second end,
the outer surface of the rotor extends between the first and second ends and the outer surface of the rotor is disposed radially from the central axis;
the plurality of magnets are located in the pockets between the outer surface and the central axis or forming a portion of the outer surface.

17. The rotor of claim 16, wherein an outer diameter at the first axial position is a first diameter, an outer diameter at the second axial position is a second diameter, an outer diameter at a third axial position is a third diameter, and the third diameter is equal to one of the first and second diameters, and the first and second diameters are different from one another.

18. The rotor of claim 16, wherein an outer diameter at the first axial position is a first diameter, an outer diameter at the second axial position is a second diameter, the first and second diameters being different from one another, and a transition in diameter between the first and second axial positions occurs stepwise.

19. The rotor of claim 16, wherein an outer diameter at the first axial position is a first diameter, an outer diameter at the second axial position is a second diameter, the first and second diameters being different from one another, and the gap tapers from the diameter at the first axial position to the diameter at the second axial position.

20. The rotor of claim 16, wherein an outer diameter at the first axial position is a first diameter, an outer diameter at the second axial position is a second diameter, an outer diameter at a third axial position is a third diameter, and the first diameter is larger than the second diameter, the third diameter is equal to the first diameter and the first axial position is located between the second and third axial positions.

21. The rotor of claim 16, wherein an outer diameter at the first axial position is a first diameter, an outer diameter at the second axial position is a second diameter, an outer diameter at a third axial position is a third diameter, and the first diameter is smaller than the second diameter, the third diameter is equal to the second diameter and the first axial position is located between the second and third axial positions.

22. The rotor of claim 18, wherein an outer diameter at a third axial position is a third diameter, the first diameter is larger than the second diameter, the third diameter is equal to the first diameter, and the first axial position is located between the second and third axial positions.

23. The rotor of claim 18, wherein an outer diameter at a third axial position is a third diameter, the first diameter is smaller than the second diameter, the third diameter is equal to the second diameter, and the first axial position is located between the second and third axial positions.

24. The rotor of claim 19, wherein an outer diameter at a third axial position is a third diameter, the first diameter is smaller than the second diameter, the third diameter is equal to the second diameter, and the first axial position is located between the second and third axial positions.

25. The rotor of claim 19, wherein an outer diameter at a third axial position is a third diameter, the first diameter is larger than the second diameter, the third diameter is equal to the second diameter, and the first axial position is located between the second and third axial positions.

26. The rotor of claim 20, wherein the second axial position occurs at the first end of the rotor and the third axial position occurs at the second end of the rotor and the first axial position occurs between the first and second ends of the rotor.

27. The rotor of claim 26, wherein the first axial position occurs at a midline of the rotor.

28. The rotor of claim 22, wherein the second axial position occurs at the first end of the rotor and the third axial position occurs at the second end of the rotor and the first axial position occurs between the first and second ends of the rotor.

29. The rotor of claim 28, wherein the first axial position occurs at a midline of the rotor.

30. The PM motor of claim 1, wherein:
the stator comprises a third and a fourth end, teeth;
the inner surface of the stator extends between the third and fourth ends;
the teeth are sized and configured for wrapping with an electromagnetic coil, and
the inner surface defines an inner diameter that varies as a function of linear position between the third and fourth ends.

31. The stator of claim 30, wherein an inner diameter at a first linear position is a first diameter, an inner diameter at a second linear position is a second diameter, an inner diameter at a third linear position is a third diameter, and the third diameter is equal to one of the first and second diameters, and the first and second diameters are different from one another.

32. The stator of claim 30, wherein an inner diameter at a first linear position is a first diameter, an inner diameter at a second linear position is a second diameter, the first and second diameters being different from one another, and a transition in diameter between the first and second linear positions occurs stepwise.

33. The stator of claim 30, wherein an inner diameter at a first linear position is a first diameter, an inner diameter at a second linear position is a second diameter, the first and second diameters being different from one another, and the gap tapers from the diameter at the first linear position to the diameter at the second linear position.

34. The stator of claim 30, wherein an inner diameter at a first linear position is a first diameter, an inner diameter at a second linear position is a second diameter, an inner diameter at a third linear position is a third diameter, and the first diameter is larger than the second diameter, the third diameter is equal to the second diameter and the first linear position is located between the second and third linear positions.

35. The stator of claim 30, wherein an inner diameter at a first linear position is a first diameter, an inner diameter at a second linear position is a second diameter, an inner diameter at a third linear position is a third diameter, and the first diameter is smaller than the second diameter, the third diameter is equal to the second diameter and the first linear position is located between the second and third linear positions.

36. The stator of claim 32, wherein an inner diameter at a third linear position is a third diameter, the first diameter is larger than the second diameter, the third diameter is equal to the second diameter, and the first linear position is located between the second and third linear positions.

37. The stator of claim 32, wherein an inner diameter at a third linear position is a third diameter, the first diameter is smaller than the second diameter, the third diameter is equal to the second diameter, and the first linear position is located between the second and third linear positions.

38. The stator of claim 33, wherein an inner diameter at a third linear position is a third diameter, the first diameter is smaller than the second diameter, the third diameter is equal to the second diameter, and the first linear position is located between the second and third linear positions.

39. The stator of claim 33, wherein an inner diameter at a third linear position is a third diameter, the first diameter is larger than the second diameter, the third diameter is equal to the second diameter, and the first linear position is located between the second and third linear positions.

40. The stator of claim 35, wherein the second linear position occurs at the third end of the stator and the third linear position occurs at the fourth end of the stator and the first linear position occurs between the third and fourth ends of the stator.

41. The stator of claim 40, wherein the first linear position occurs at a midline of the stator.

42. The stator of claim 36, wherein the second linear position occurs at the third end of the stator and the third linear position occurs at the fourth end of the stator and the first linear position occurs between the third and fourth ends of the stator.

43. The stator of claim 42, wherein the first linear position occurs at a midline of the stator.

\* \* \* \* \*